United States Patent
Takeda

(10) Patent No.: US 10,465,071 B2
(45) Date of Patent: Nov. 5, 2019

(54) POLYAMIDE RESIN

(71) Applicant: KURARAY CO., LTD., Kurashiki-shi (JP)

(72) Inventor: Hideaki Takeda, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/427,789

(22) PCT Filed: Sep. 6, 2013

(86) PCT No.: PCT/JP2013/074120
§ 371 (c)(1),
(2) Date: Mar. 12, 2015

(87) PCT Pub. No.: WO2014/042098
PCT Pub. Date: Mar. 20, 2014

(65) Prior Publication Data
US 2015/0240078 A1    Aug. 27, 2015

(30) Foreign Application Priority Data

Sep. 14, 2012 (JP) ................. 2012-202362

(51) Int. Cl.
*C08L 77/06* (2006.01)
*C08G 69/26* (2006.01)
*C08K 3/22* (2006.01)

(52) U.S. Cl.
CPC .............. *C08L 77/06* (2013.01); *C08G 69/26* (2013.01); *C08K 3/22* (2013.01); *C08K 2003/222* (2013.01); *C08K 2003/2296* (2013.01); *C08L 2205/025* (2013.01)

(58) Field of Classification Search
CPC .......... C08L 77/00; C08L 77/02; C08L 77/06; C08G 69/40; C08J 2377/06
See application file for complete search history.

(56) References Cited

U.S. PATENT DOCUMENTS

| | | | | |
|---|---|---|---|---|
| 6,548,591 B2* | 4/2003 | Koning | ................... | C08L 77/00 524/494 |
| 2006/0014866 A1* | 1/2006 | Ottenheijm | ........ | C08K 5/34928 524/115 |
| 2006/0108708 A1* | 5/2006 | Wakita | .................... | B32B 27/08 264/248 |
| 2009/0131569 A1* | 5/2009 | Schwitter | ................ | C08L 77/00 524/423 |
| 2011/0028614 A1* | 2/2011 | Shikano | ............... | C08G 69/265 524/126 |
| 2012/0170277 A1 | 7/2012 | Tamura et al. | | |

FOREIGN PATENT DOCUMENTS

| | | |
|---|---|---|
| JP | 47-042397 B | 10/1972 |
| JP | 64-011073 B2 | 2/1989 |
| JP | 09-012868 A | 1/1997 |
| JP | 2002-212416 A | 7/2002 |
| JP | 2011-057903 A | 3/2011 |

OTHER PUBLICATIONS

U.S. Appl. No. 14/431,509, filed Mar. 26, 2015, Oya, et al.
International Search Report dated Dec. 10, 2013 in PCT/JP2013/074120 Filed Sep. 6, 2013.
Extended European Search Report dated Feb. 18, 2016 in Patent Application No. 13836455.9.

* cited by examiner

*Primary Examiner* — Gregory Listvoyb
(74) *Attorney, Agent, or Firm* — Oblon, McClelland, Maier & Neustadt, L.L.P.

(57) ABSTRACT

The present invention is a polyamide resin (A) that contains from 95 to 99.95% by mass of a polyamide (a-1) having a number-average molecular weight of 2000 or more and from 0.05 to 5% by mass of a polyamide oligomer (a-2) having a number-average molecular weight of from 500 to less than 2000, in which at least 25 mol % of all the monomer units constituting the polyamide (a-1) and the polyamide oligomer (a-2) are structural units derived from a specific alicyclic monomer, and the content ratio of the trans isomer structural units derived from the alicyclic monomer is from 50 to 85 mol %. The polyamide resin (A) is excellent in heat resistance, low water absorption, high-temperature rigidity, chemical resistance and flowability, and exhibits the effects of securing sufficient crystallization even when molded in a mold at 80° C. and causing minimal mold deposit during production.

14 Claims, 3 Drawing Sheets

POLYAMIDE RESIN

CROSS-REFERENCE TO RELATED APPLICATIONS

This application is a National Stage of PCT/JP2013/074120, which was filed on Sep. 6, 2013. This application is based upon and claims the benefit of priority to Japanese Application No. 2012-202362, which was filed on Sep. 14, 2012.

TECHNICAL FIELD

The present invention relates to a polyamide resin, a polyamide resin composition and a molded article comprising the same.

BACKGROUND ART

Heretofore, polyamides, typically, such as polyamide 6 (hereinafter abbreviated as PA6), polyamide 66 (hereinafter abbreviated as PA66) and the like, have been widely used as fibers for clothing and industrial materials and also as general-purpose engineering plastics because of their excellent characteristics and easiness in melt molding. On the other hand, some problems of poor heat resistance, dimensional stability insufficiency owing to water absorption and the like with those polyamides are pointed out. These days in particular, in electric/electronic fields that require reflow soldering heat resistance with advanced surface-mounting technology (SMT) and in automobile engine room parts and the like of which the requirement for heat resistance is increasing year by year, it has become difficult to use already-existing polyamides, and it has been desired to develop polyamides excellent in heat resistance, low water absorption, mechanical properties and physicochemical properties. Further, in coolant system parts applications such as radiator tanks, reservoir tanks or heater cores that use a long-life coolant, it has been desired to further improve the chemical resistance of polyamides.

For solving the above-mentioned problems with already-existing polyamides such as PA6, PA66 and the like, development of high-melting-point polyamides having a rigid cyclic structure in the main chain thereof has been promoted. For example, as polyamides having an aromatic ring structure, various semi-aromatic polyamides comprising, as the main component thereof, a polyamide of terephthalic acid and 1,6-hexanediamine (hereinafter abbreviated as PA6T) are proposed. PA6T has a melting point of around 370° C. or so which is higher than the decomposition temperature thereof, and therefore melt polymerization and melt molding with it may be difficult. Consequently, the polyamide is copolymerized with any other dicarboxylic acid component such as adipic acid, isophthalic acid or the like or an aliphatic polyamide such as PA6 or the like, and is used as a composition thereof whose melting point is lowered to a practicable temperature region of from 280 to 320° C. or so. In such a manner, copolymerization with a third component may be effective in lowering the melting point of the resultant polymer, which, however, is often accompanied by reduction in the crystallization rate and in the crystallinity of the polymer, and as a result, there occur various problems in that high-temperature rigidity (for example, the deflection temperature under load of polyamide at a temperature higher by about 20° C. than the glass transition temperature thereof is measured), chemical resistance, and various physical properties such as dimensional stability which water absorption affects worsen and, in addition, the productivity lowers owing to prolongation of the molding cycle. Further, relative to various physical properties such as dimensional stability which water absorption affects, the polymers are not still on a practical level though they are somewhat improved as compared with already-existing PA6 and PA66 owing to introduction of the aromatic group thereinto.

PTL 1 describes a polyamide composition that comprises a semi-aromatic polyamide comprising an aromatic dicarboxylic acid unit containing from 60 to 100 mol % of a terephthalic acid unit and a linear aliphatic alkylenediamine unit having from 6 to 18 carbon atoms, and contains a filler in an amount of from 0.5 to 200 parts by weight, relative to 100 parts by weight of the polyamide, and says that the polyamide composition is excellent in all of heat-resistant characteristics, mechanical characteristics, chemico-physical characteristics and molding characteristics.

On the other hand, as a polyamide having an alicyclic structure, PTL 2 discloses a copolyamide produced through copolymerization, which is a copolyamide comprising a polyamide component composed of 1,4-cyclohexanedicarboxylic acid and 1,9-nonanediamine and a polyamide component composed of terephthalic acid and 1,6-hexanediamine in a ratio by weight of from 25/75 to 85/15. However, the copolyamide has a low melting point and is therefore insufficient in point of the effect of improving the heat resistance thereof. A polyamide comprising a 1,4-cyclohexanedicarboxylic acid an aliphatic diamine having from 6 to 18 carbon atoms, which is described in PTL 3, is excellent in heat resistance, light resistance, toughness and low water absorption, but still has room for improvement in flowability.

Further, in a field of high-melting point polyamides, knowledge relating to the relationship between the moldability and the crystallinity of a high-melting-point polyamide is not sufficient.

CITATION LIST

Patent Literature

PTL 1: JP-B 64-11073
PTL 2: JP-B 47-42397
PTL 3: JP-A 9-12868

SUMMARY OF INVENTION

Technical Problem

Given the situation, an object of the present invention is to provide a polyamide resin which is excellent in heat resistance, low water absorption, high-temperature rigidity, chemical resistance and flowability, sufficient crystallization even when molded in a mold having a temperature of 80° C. and minimal mold deposit during production.

Solution to Problem

According to the present invention, the above-mentioned object can be attained by providing the following:

(1) A polyamide resin (A) that contains from 95 to 99.95% by mass of a polyamide (a-1) having a number-average molecular weight of 2000 or more and from 0.05 to 5% by mass of a polyamide oligomer (a-2) having a number-average molecular weight of from 500 to less than 2000, in which at least 25 mol % of all the monomer units constituting the polyamide (a-1) and the polyamide oligomer (a-2)

are structural units derived from an alicyclic monomer represented by the following general formula (I) or general formula (II), and the content ratio of the trans isomer structural units derived from the alicyclic monomer is from 50 to 85 mol %:

X—Z—X  (I)

(wherein X represents a carboxyl group or an amino group, and Z represents an alicyclic structure having 3 or more carbon atoms),

X—R$^1$—Z—R$^2$—X  (II)

(wherein X and Z are as defined above, and R$^1$ and R$^2$ each independently represent an alkylene group having 1 or more carbon atoms);

(2) The polyamide resin (A) according to the above (1), wherein at least 10% of the total of the terminal groups of the molecular chains of the polyamide (a-1) and the polyamide oligomer (a-2) constituting the polyamide resin (A) are blocked with a terminal blocking agent;

(3) The polyamide resin (A) according to the above (1) or (2), wherein the alicyclic monomer is a cyclic aliphatic dicarboxylic acid of the general formula (I) or the general formula (II) where X is a carboxyl group;

(4) The polyamide resin (A) according to the above (3), wherein the cyclic aliphatic dicarboxylic acid is 1,4-cyclohexanedicarboxylic acid;

(5) The polyamide resin (A) according to any of the above (1) to (4), wherein the polyamide (a-1) and the polyamide oligomer (a-2) contain a structural unit derived from an aliphatic diamine having from 4 to 12 carbon atoms;

(6) The polyamide resin (A) according to the above (5), wherein the aliphatic diamine is at least one selected from 1,4-butanediamine, 1,5-pentanediamine, 1,6-hexanediamine, 2-methyl-1,5-pentanediamine, 1,8-octanediamine, 1,9-nonanediamine, 2-methyl-1,8-octanediamine, 1,10-decanediamine, 1,11-undecanediamine and 1,12-dodecanediamine;

(7) The polyamide resin (A) according to the above (6), which contains a structural unit derived from 1,4-cyclohexanedicarboxylic acid in an amount of 25 mol % or more and contains, as a structural unit derived from the aliphatic diamine, 1,9-nonanediamine and/or 2-methyl-1,8-octanediamine in an amount of 25 mol % or more;

(8) The polyamide resin (A) according to any of the above (1) to (7), which further contains a structural unit derived from a lactam and/or an aminocarboxylic acid;

(9) A polyamide resin composition containing the polyamide resin (A) of any of the above (1) to (8) and from 0.1 to 10 parts by mass of a compound (B) acting as a Lewis base relative to 100 parts by mass of the polyamide resin (A);

(10) The polyamide resin composition according to the above (9), wherein the compound (B) acting as a Lewis base is at least one selected from a group consisting of alkali metal oxides, alkali metal hydroxides, alkaline earth metal oxides, alkaline earth metal hydroxides, zinc oxide and zinc hydroxide;

(11) The polyamide resin composition according to the above (10), wherein the compound (B) acting as a Lewis base is at least one selected from a group consisting of potassium oxide, magnesium oxide, calcium oxide, zinc oxide, potassium hydroxide, magnesium hydroxide, calcium hydroxide and zinc hydroxide;

(12) A molded article comprising the polyamide resin (A) according to any of the above (1) to (8);

(13) A molded article comprising the polyamide resin composition according to any of the above (9) to (11).

Advantageous Effects of Invention

According to the present invention, there is provided a polyamide resin which is excellent in heat resistance, low water absorption, high-temperature rigidity, chemical resistance and flowability, sufficient crystallization even when molded in a mold at 80° C. and minimal mold deposit during molding.

DESCRIPTION OF EMBODIMENTS

Figure 1:
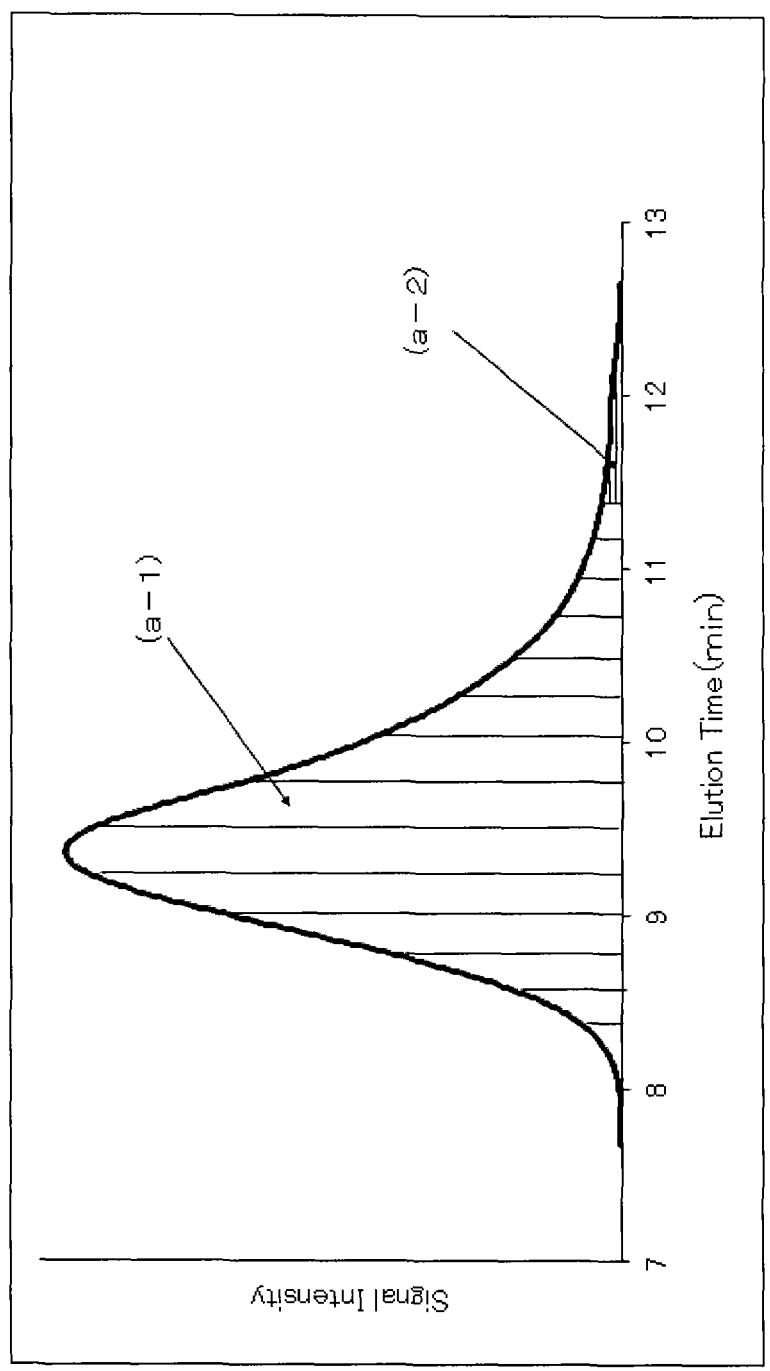
FIG. 1 This is a GPC elution curve (vertical axis: signal intensity, horizontal axis: elution time) of the polyamide resin (A) obtained in Example 1.

The present invention is described in detail hereinunder.
[Polyamide Resin (A)]

The polyamide resin (A) of the present invention contains from 95 to 99.95% by mass of a polyamide (a-1) having a number-average molecular weight of 2000 or more. The number-average molecular weight is determined in terms of a standard polymethyl methacrylate (standard PMMA), and is calculated from the elution curve of each sample analyzed through gel permeation chromatography (hereinafter abbreviated as GPC) under the measurement condition shown in the section of Examples to be given hereinunder, and from the area of the region surrounded by the base line and the elution curve to cover from the number-average molecular weight of at least 2000 to the molecular weight at which the main peak detection terminates. The polyamide resin (A) of the present invention also contains from 0.05 to 5% by mass of a polyamide oligomer (a-2) having a number-average molecular weight of from 500 to less than 2000, as measured through GPC under the same condition as that for the polyamide (a-1).

When the content (% by mass) of the polyamide (a-1) and that of the polyamide oligomer (a-2) each fall within the above range, then the flowability of the resultant polyamide resin (A) and the polyamide resin composition to be described below may be improved, and the resin and the resin composition can secure sufficient crystallization even when molded in a mold at 80° C. In addition, mold deposit attributable to the polyamide oligomer (a-2) can be prevented.

Though not clear, the reason why the effects could be attained may be presumed, for example, as follows. Specifically, it is considered that the mobility of the molecular chains of the polyamide oligomer (a-2) in a molten state is high and would therefore act advantageously for crystallization.

From the viewpoint of more favorably realizing the advantageous effects of the present invention, the resin contains preferably from 97 to 99.95% by mass, more preferably from 98 to 99.95% by mass of the polyamide (a-1). In conformity with that, the resin contains preferably from 0.05 to 3% by mass, more preferably from 0.05 to 2% by mass of the polyamide oligomer (a-2).

In the polyamide resin (A) of the present invention, at least 25 mol % of all the monomer units constituting the polyamide (a-1) and the polyamide oligomer (a-2) are structural units derived from an alicyclic monomer represented by the following general formula (I) or general formula (II), and the content ratio of the trans isomer structural units derived from the alicyclic monomer is from 50 to 85 mol %.

  (I)

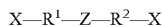  (II)

(In the formulae, X, Z, $R^1$ and $R^2$ are as defined above.)

The alicyclic structure having 3 or more carbon atoms, which is represented by Z, includes, for example, a monocyclic or polycyclic cycloalkylene group such as a cyclopropylene group, a cyclobutylene group, a cyclopentylene group, a cyclohexylene group, a cycloheptylene group, a cyclooctylene group, a cyclononylene group, a cyclodecylene group, a cycloundecylene group, a cyclododecylene group, a dicyclopentylene group, a dicyclohexylene group, a tricyclodecalene group, a norbornylene group, an adamantylene group, etc.

The alkylene group having 1 or more carbon atoms, which is represented by $R^1$ and $R^2$, includes, for example, a saturated aliphatic alkylene group such as a methylene group, an ethylene group, a propylene group, a butylene group, a pentylene group, a hexylene group, a heptylene group, an octylene group, etc. These may have a substituent. Examples of the substituent includes an alkyl group having preferably from 1 to 4 carbon atoms, such as a methyl group, an ethyl group, a propyl group, a butyl group or the like, and a hydroxyl group, a halogen group, etc.

As the alicyclic monomer, usable here is one alone or two or more of a cyclic aliphatic dicarboxylic acid where X is a carboxyl group and a cyclic aliphatic diamine where X is an amino group, either singly or as combined.

The cyclic aliphatic dicarboxylic acid is, for example, a cyclic aliphatic dicarboxylic acid having from 3 to 10 carbon atoms, preferably a cyclic aliphatic dicarboxylic acid having from 5 to 10 carbon atoms, and more concretely includes 1,4-cyclohexanedicarboxylic acid, 1,3-cyclohexanedicarboxylic acid and 1,3-cyclopentanedicarboxylic acid.

The cyclic aliphatic dicarboxylic acid may have any other substituent than a carboxyl group on the alicyclic skeleton thereof. Examples of the substituent includes, for example, an alkyl group having from 1 to 4 carbon atoms such as a methyl group, an ethyl group, an n-propyl group, an isopropyl group, an n-butyl group, an isobutyl group, a tert-butyl group, etc.

The cyclic aliphatic dicarboxylic acid is more preferably 1,4-cyclohexanedicarboxylic acid from the viewpoint of heat resistance, flowability and high-temperature rigidity. One alone or two or more cyclic aliphatic dicarboxylic acids may be used here either singly or as combined.

The cyclic aliphatic dicarboxylic acid includes geometric isomers of a trans form and a cis form. A case where two carboxyl groups exist on different sides relative to the cyclic structure is a trans form, and a case where two carboxylic groups exist on the same side relative to the cyclic structure is a cis form.

For example, when 1,4-cyclohexanedicarboxylic acid is used as the cyclic aliphatic dicarboxylic acid, a case where both the two substituents occupy an axial site or an equatorial site is a trans form and a case where they respectively occupy an axial site and an equatorial site is a cis form, as described in Modern Organic Chemistry (4th ed.), Vol. 1 (K. P. C. Vollhardt, N. E. Schore, Kagaku-Dojin Publishing Company. Inc, Apr. 1, 2004, p. 174).

Any one of a trans form or a cis form of the cyclic aliphatic dicarboxylic acid may be used, and a mixture of a trans form and a cis form thereof in any desired ratio may also be used.

In case where 1,4-cyclohexanedicarboxylic acid is used as the cyclic aliphatic dicarboxylic acid, the ratio of trans form/cis form thereof in use for polymerization is preferably from 50/50 to 0/100 (molar ratio), more preferably from 40/60 to 10/90, even more preferably from 35/65 to 15/85, from the viewpoint that the ratio of trans form to cis form may converge through isomerization at high temperatures and from the viewpoint that, as compared with that with the trans form, an equivalent salt of the cis form with a diamine may have a high solubility in water. The ratio of trans form/cis form (molar ratio) of the cyclic aliphatic dicarboxylic acid may be determined through $^1$H-NMR (see the section of Examples given hereinunder).

The cyclic aliphatic diamine is, for example, a cyclic aliphatic diamine having from 3 to 10 carbon atoms, preferably from 5 to 10 carbon atoms, and the specific examples thereof include 1,4-cyclohexanediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, methylcyclohexanediamine, isophoronediamine, norbornanediamine, tricyclodecanediamine, etc.

The cyclic aliphatic diamine may have any other substituent than an amino group on the alicyclic skeleton thereof. The substituent includes, for example, an alkyl group preferably having from 1 to 4 carbon atoms such as a methyl group, an ethyl group, an n-propyl group, an isopropyl group, an n-butyl group, an isobutyl group, a tert-butyl group, etc. One alone or two or more cyclic aliphatic diamines may be used here either singly or as combined.

The cyclic aliphatic diamine includes, like the cyclic aliphatic dicarboxylic acid, geometric isomers of a trans form and a cis form. A case where two amino groups exist on different sides relative to the cyclic structure is a trans form, and a case where two amino groups exist on the same side relative to the cyclic structure is a cis form.

For example, when 1,4-cyclohexanediamine is used as the cyclic aliphatic diamine, a case where both the two substituents occupy an axial site or an equatorial site is a trans form and a case where they respectively occupy an axial site and an equatorial site is a cis form, as described in Modern Organic Chemistry (4th ed.), Vol. 1 (K. P. C. Vollhardt, N. E. Schore, Kagaku-Dojin Publishing Company. Inc, Apr. 1, 2004, p. 174).

Any one of a trans form or a cis form of the cyclic aliphatic diamine may be used, and a mixture of a trans form and a cis form thereof in any desired ratio may also be used.

In case where 1,4-cyclohexanediamine is used as the cyclic aliphatic diamine, the ratio of trans form/cis form thereof in use for polymerization is preferably from 50/50 to 0/100 (molar ratio), more preferably from 40/60 to 10/90, even more preferably from 35/65 to 15/85, from the viewpoint that the ratio of trans form to cis form may converge through isomerization at high temperatures and from the viewpoint that, as compared with that with the trans form, an equivalent salt of the cis form with a dicarboxylic acid may have a high solubility in water. The ratio of trans form/cis form (molar ratio) of the cyclic aliphatic diamine may be determined through $^1$H-NMR.

In the polyamide resin (A) of the present invention, the structural units derived from the alicyclic monomer exist as trans isomer structural units and cis isomer structural units. The content ratio of the trans isomer structural units derived from the alicyclic monomer is from 50 to 85 mol % of the structural units derived from the alicyclic monomer constituting the polyamide resin (A), preferably from 60 to 85 mol %, more preferably from 70 to 85 mol %, even more preferably from 80 to 85 mol %. When the content ratio of the trans isomer structural units falls within the above range, then the polyamide resin (A) is excellent in high-temperature rigidity and flowability and secures sufficient crystallization even when molded in a mold at 80° C. These are especially remarkable in the case of the polyamide resin (A) using 1,4-cyclohexanedicarboxylic acid as the alicyclic monomer.

In this specification, "trans isomer structural unit" derived from the alicyclic monomer of the polyamide resin (A) means a structural unit in which amide bonds exist on different sides relative to the alicyclic structure therein.

The polyamide resin (A) of the present invention may contain any structural unit derived from any other monomer capable of forming an amide bond, in addition to the structural units derived from the alicyclic monomer represented by the general formula (I) or the general formula (II). The other monomer includes, for example, dicarboxylic acids such as aliphatic dicarboxylic acids, aromatic dicarboxylic acids, etc.; tri- or more poly-carboxylic acids; diamines such as aliphatic diamines, aromatic diamines, etc.; tri- or more poly-amines; lactams; and aminocarboxylic acids. One alone or two or more of these may be used here either singly or as combined.

The aliphatic dicarboxylic acids include, for example, linear or branched saturated aliphatic dicarboxylic acids having from 3 to 20 carbon atoms, such as oxalic acid, malonic acid, dimethylmalonic acid, succinic acid, glutaric acid, adipic acid, 2-methyladipic acid, pimelic acid, 2,2-dimethylglutaric acid, suberic acid, 3,3-diethylsuccinic acid, azelaic acid, sebacic acid, dodecane-diacid, tridecene-diacid, tetradecane-diacid, pentadecane-diacid, hexadecane-diacid, heptadecene-diacid, octadecane-diacid, nonadecane-diacid, eicosane-diacid, dimer acid, etc.

The aromatic dicarboxylic acids include, for example, terephthalic acid, isophthalic acid, phthalic acid, 1,4-naphthalenedicarboxylic acid, 2,6-naphthalenedicarboxylic acid, 2,7-naphthalenedicarboxylic acid, 1,4-phenylenedioxydiacetic acid, 1,3-phenylenedioxydiacetic acid, diphenic acid, 4,4'-oxy-dibenzoic acid, diphenylmethane-4,4'-dicarboxylic acid, diphenylsulfone-4,4'-dicarboxylic acid, 4,4'-biphenyldicarboxylic acid, etc. The tri- or more polycarboxylic acids include, for example, trimellitic acid, trimesic acid, pyromellitic acid, etc.

The aliphatic diamines include, for example, linear saturated aliphatic diamines such as ethylenediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosadecanediamine, etc.; branched saturated aliphatic diamines such as 1,2-propanediamine, 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1.7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine, 3,7-dimethyl-1,10-decanediamine, 7,8-dimethyl-1,10-decanediamine, etc.

The aromatic diamines include, for example, metaxylylenediamine, paraxylylenediamine, etc. The tri- or more polyamines include, for example bishexamethylenetriamine, etc.

The lactams include, for example, ε-caprolactam, ω-laurolactam, butyrolactam, pivalolactam, caprylolactam, enantolactam, undecanolactam, laurolactam (dodecanolactam), etc. Above all, preferred are ε-caprolactam and w-laurolactam. The aminocarboxylic acids include, α,ω-aminocarboxylic acids, and, for example, there are mentioned saturated aliphatic aminocarboxylic acids having from 4 to 14 carbon atoms and substituted with an amino group at the co-position thereof, such as 6-aminocaproic acid, 11-aminoundecanoic acid, 12-aminododecanoic acid, etc., as well as paraaminomethylbenzoic acid. Lactam and/or aminocarboxylic acid units, if any, are effective for improving the toughness of the polyamide resin (A) of the present invention.

The polyamide resin (A) of the present invention preferably contains structural units derived from an aliphatic diamine having from 4 to 12 carbon atoms as the monomer units constituting the polyamide (a-1) and the polyamide oligomer (a-2), from the viewpoint of the heat resistance, the low water absorption and the flowability thereof. The structural unit derived from an aliphatic diamine having from 4 to 12 carbon atoms is preferably any one or more of 1,4-butanediamine, 1,5-pentanediamine, 1,6-hexanediamine, 2-methyl-1,5-pentanediamine, 1,8-octanediamine, 1,9-nonanediamine, 2-methyl-1,8-octanediamine, 1,10-decanediamine, 1,11-undecanediamine, 1,12-dodecanediamine. More preferably, the resin contains structural units derived from 1,9-nonanediamine and/or 2-methyl-1,8-octanediamine. Even more preferably, the structural units derived from an aliphatic diamine to constitute the polyamide resin (A) contain structural units derived from 1,9-nonanediamine and/or 2-methyl-1,8-octanediamine in an amount of 25 mol % or more. In case where 1,9-nonanediamine and 2-methyl-1,8-octanediamine are combined here, the ratio of 1,9-nonanediamine/2-methyl-1,8-octanediamine is preferably from 99/1 to 1/99 (molar ratio), more preferably from 95/5 to 50/50.

Above all, the polyamide resin (A) containing at least 25 mol % of structural units derived from 1,4-cyclohexanedicarboxylic acid and containing, as structural units derived from an aliphatic diamine, at least 25 mol % of structural units derived from 1,9-nonanediamine and/or 2-methyl-1,8-octanediamine is excellent in heat resistance, low water absorption, chemical resistance and flowability.

In case where 1,4-cyclohexanedicarboxylic acid and 1,4-cyclohexanediamine are used as the alicyclic monomer, the content ratio of the trans isomer structural units is preferably higher since the resultant polyamide resin (A) could have a melting point favorable in molding the resin. The content ratio of the trans isomer structural units is preferably from 50 to 100 mol %, more preferably from 50 to 90 mol %, even more preferably from 50 to 85 mol %, still more preferably from 60 to 85 mol %, further more preferably from 70 to 85 mol %, most preferably from 80 to 85 mol %.

In the polyamide resin (A) of the present invention, the structural units derived from the alicyclic monomer to constitute the polyamide (a-1) and the polyamide oligomer (a-2) may be the same or different, but are preferably the same from the viewpoint of the moldability in a mold at 80° C. with respect to the polyamide resin (A) and the polyamide resin composition to be described below.

In the polyamide resin (A) of the present invention, when at least 10% of the total of the terminal groups in the molecular chains of the polyamide (a-1) and the polyamide oligomer (a-2) that are the constituent components of the resin are blocked with a terminal blocking agent, then the physical properties such as the melt processability may be further improved.

Here, the terminal blocking ratio may be determined by measuring the number of each of the terminal carboxyl groups, the terminal amino groups and the terminal groups blocked with a terminal blocking agent in the molecular chains of the polyamide (a-1) and the polyamide oligomer (a-2) that are the constituent components of the polyamide resin (A), for example, through $^1$H-NMR, based on the integral value of the characteristic signal corresponding to each terminal group and then obtaining the ratio by calculation (see the section of Examples given hereinunder).

Not specifically defined, the terminal blocking agent may be any monofunctional compound having reactivity with an amino group or a carboxyl group, and includes monocarboxylic acids, monoamines, acid anhydrides, monoisocyanates, mono-acid halides, monoesters, monoalcohols, etc. Above all, preferred are monocarboxylic acids and monoamines from the viewpoint of the reactivity thereof and the stability of the blocked terminals and more preferred are monocarboxylic acids from the viewpoint of the easy handleability thereof.

The monocarboxylic acids include, for example, aliphatic monocarboxylic acids such as acetic acid, propionic acid, butyric acid, valeric acid, caproic acid, caprylic acid, lauric acid, tridecenoic acid, myristic acid, palmitic acid, stearic acid, pivalic acid, isobutyric acid, etc.; alicyclic monocarboxylic acids such as cyclohexanecarboxylic acid, etc.; aromatic monocarboxylic acids such as benzoic acid, toluic acid, α-naphthalenecarboxylic acid, β-naphthalenecarboxylic acid, methylnaphthalenecarboxylic acid, phenylacetic acid, etc.; arbitrary mixtures of these, etc. Above all, preferred are acetic acid, propionic acid, butyric acid, valeric acid, caproic acid, caprylic acid, lauric acid, tridecenoic acid, myristic acid, palmitic acid, stearic acid, cyclohexanecarboxylic acid and benzoic acid, from the viewpoint of the reactivity, the stability of the blocked terminals and the cost.

The terminal blocking agent may be added according to any of a method of previously adding the terminal blocking agent before polymerization, a method of adding it during polymerization, or a method of adding it in a step of melt kneading or molding the resin. The terminal blocking agent added according to any of these methods can fulfill the function thereof.

Preferably, ηinh of the polyamide resin (A) of the present invention, as measured in concentrated sulfuric acid having a sample concentration of 0.2 g/dL at 30° C., falls within a range of from 0.4 to 3.0 dL/g, more preferably within a range of from 0.5 to 2.0 dL/g, even more preferably within a range of from 0.6 to 1.8 dL/g. When ηinh falls within the above range, then the polyamide resin (A) is more excellent in heat resistance and high-temperature rigidity.

[Compound (B) Acting as Lewis Base]

The polyamide resin (A) of the present invention may contain from 0.1 to 10 parts by mass, preferably from 0.1 to 5 parts by mass of a compound (B) acting as a Lewis base relative to 100 parts by mass of the polyamide resin (A). When the amount of the compound (B) acting as a Lewis acid is controlled to fall within the above range, the content ratio of the trans isomer structural units derived from the alicyclic monomer represented by the general formula (I) or the general formula (II) that constitute the polyamide (a-1) and the polyamide oligomer (a-2) can be controlled to be from 50 to 85 mol %, which is defined in the present invention, therefore providing a polyamide resin composition excellent in heat resistance and high-temperature rigidity. Further, the crystal structure of the resultant polyamide resin composition can be tougher, and the chemical resistance thereof can be improved.

As the compound (B) acting as a Lewis base, for example, preferred is use of at least one selected from a group consisting of alkali metal oxides, alkali metal hydroxides, alkaline earth metal oxides, alkaline earth metal hydroxides, zinc oxide and zinc hydroxide.

The alkali metal oxides and the alkaline earth metal oxides include, for example, potassium oxide, magnesium oxide, calcium oxide, etc.; and the alkali metal hydroxides and the alkaline earth metal hydroxides include, for example, potassium hydroxide, magnesium hydroxide, calcium hydroxide, etc. Two or more of these may be used here, as combined.

If desired, the polyamide resin composition of the present invention may contain any other component, for example, any other thermoplastic resin than the polyamide (a-1) and the polyamide oligomer (a-2); a compatibilizer, a filler, a silane coupling agent, a crystal nucleating agent, a copper-based thermal stabilizer; an antioxidant such as a hindered phenol-based antioxidant, a hindered amine-based antioxidant, a phosphorus-containing antioxidant, a thio-based antioxidant, etc.; a dye, a pigment, a UV absorbent, a light stabilizer, an antistatic agent, a lubricant, a plasticizer, a mold release agent, a flame retardant, a flame retardation promoter, a processing aid, etc.

The compound (B) acting as a Lewis base may be previously contained in the polyamide resin (A). The method for making the compound (B) acting as a Lewis base as well as the above-mentioned other components contained in the composition may be any method capable of uniformly mixing the polyamide resin (A), the compound (B) acting as a Lewis base and any other optional components, for which, in general, employable is a method of melt-kneading them using a single-screw extruder, a twin-screw extruder, a kneader, a Banbury mixer or the like. The melt-kneading condition is not specifically defined. For example, the components may be melt-kneaded in a temperature range higher by from 30 to 50° C. than the melting point for 1 to 30 minutes to give the polyamide resin composition of the present invention.

[Method for Producing Polyamide Resin (A)]

As the method for producing the polyamide resin (A) of the present invention, herein mentioned is a method that comprises preparing polyamides differing in the number average molecular weight and in the molecular weight distribution, and mixing them in such a controlled manner that the content of the polyamide (a-1) and that of the polyamide oligomer (a-2) (% by mass) each could fall within the range defined in the present invention. The polyamides may be prepared in any known method, for example, according to a melt polymerization method, a solid-phase polymerization method, a melt extrusion polymerization method or the like using a dicarboxylic acid and a diamine as starting materials.

As the mixing method, for example, there may be mentioned a method of dry-blending the polyamides that differ in the number average molecular weight and the molecular weight distribution as described above, and simultaneously or separately put them into a melt-kneading apparatus.

As another method of producing the polyamide resin (A), there may also be mentioned a method that comprises selecting a suitable polymerization condition in producing the polyamide resin (A) so that the content of the polyamide (a-1) and the content of the polyamide oligomer (a-2) (% by mass) each could falls with the range defined in the present invention. Regarding the suitable polymerization condition, for example, a method employable here is mentioned. A dicarboxylic acid component and a diamine component to constitute the polyamide resin (A) and optionally a catalyst and a terminal blocking agent are put into a reactor all at a time to prepare a nylon salt, and then heated at a temperature of from 200 to 260° C. to give a solution containing a prepolymer preferably having a water content of from 10 to 40%, and thereafter the resultant solution is sprayed into an atmosphere at from 100 to 150° C. to give a powdery prepolymer of which ηinh in a concentrated sulfuric acid at a sample concentration of 0.2 g/dL at 30° C. is from 0.1 to 0.6 dL/g. Subsequently, this is further polymerized in a solid phase or polymerized using a melt extruder.

As the catalyst, for example, there are mentioned phosphoric acid, phosphorous acid, hypophosphorous acid, and salts or esters thereof. Concretely, there are mentioned salts of phosphoric acid, phosphorous acid or hypophosphorous acid with a metal such as potassium, sodium, magnesium, vanadium, calcium, zinc, cobalt, manganese, tin, tungsten, germanium, titanium, antimony or the like; ammonium salts of phosphoric acid, phosphorous acid or hypophosphorous acid; and ethyl ester, isopropyl ester, butyl ester, hexyl ester, isodecyl ester, octadecyl ester, decyl ester, stearyl ester, phenyl ester or the like of phosphoric acid, phosphorous acid or hypophosphorous acid. Here, when ηinh of the prepolymer falls within a range of from 0.1 to 0.6 dL/g, then the molar balance between the carboxyl group and the amino group can be prevented from being lost and the decrease in the polymerization rate is prevented in the later polymerization stage, and the polyamide resin (A) excellent in various physical properties can be therefore obtained.

The later solid-phase polymerization of the prepolymer is preferably carried out in an inert gas atmosphere or in an inert gas circulation. Also preferably, the polymerization temperature falls within a range of from 200° C. to a temperature lower by 20° C. than the melting point of the polyamide and the polymerization time is from 1 to 8 hours. Under the condition, the polymerization rate is high, the productivity is excellent, and discoloration and gelation can be effectively prevented, and in addition, it is easy to control the content of the polyamide (a-1) and the content of the polyamide oligomer (a-2) (% by mass) to fall within the range defined in the present invention. On the other hand, in case where the later polymerization of the prepolymer is carried out using a melt extruder, the polymerization temperature is preferably not higher than 370° C. and the polymerization time is preferably from 5 to 60 minutes. The polymerization under the condition does not almost decompose the resultant polyamide, therefore giving the polyamide (A) with no degradation, and under the condition, in addition, it is easy to control the content of the polyamide (a-1) and the content of the polyamide oligomer (a-2) (% by mass) to fall within the range defined in the present invention.

[Method for Measurement of Content of Polyamide (a-1) and Content of Polyamide Oligomer (a-2)]

The content of the polyamide (a-1) and the content of the polyamide oligomer (a-2) constituting the polyamide (A) are determined from the elution curve in GPC under the measurement condition described in the section of Examples to be given hereinunder. In GPC, in case where the polyamide resin (A) or the polyamide resin composition contains, for example, any other component soluble in the solvent that dissolves the polyamide resin (A), the other component is extracted out and removed using a solvent that does not dissolve the polyamide resin (A) but dissolves the other component, and thereafter the resultant residue is analyzed through GPC. In addition, for example, the compound (B) acting as a Lewis acid and an inorganic filler and the like that are insoluble in a solvent capable of dissolving the polyamide resin (A) may be removed by dissolving the polyamide resin composition in a solvent capable of dissolving the polyamide resin (A) and then filtering the resulting solution to remove the insolubles, and thereafter the resultant filtrate is analyzed through GPC.

The polyamide resin (A) and the polyamide resin composition of the present invention may be molded into various types of molded articles by applying thereto various molding methods that are generally employed for thermoplastic polymer compositions, such as injection molding, extrusion molding, pressing, blow molding, calender molding, casting or the like, in accordance with the type, the use and the shape of the intended molded articles. If desired, a molding method of a combination of the above-mentioned molding methods is also employable here. Further, the polyamide resin (A) or the polyamide resin composition of the present invention can be formed into various composite molded articles that are bonded, welded or cemented with other various materials, such as various thermoplastic resins, thermosetting resins, papers, metals, woods, ceramics, etc.

Via the above-mentioned molding process, the polyamide resin (A) and the polyamide resin composition of the present invention can be effectively used in production of various molded articles of various shapes and various applications for electric and electronic components, automobile components, industrial components, fibers, films, sheets, domestic articles and others.

As the electric and electronic components, for example, there are mentioned SMT connectors such as FPC connectors, B-to-B connectors, card connectors, coaxial connectors, etc.; SMT switches, SMT relays, SMT bobbins, memory card connectors, CPU sockets, LED reflectors, cable wire coatings, optical fiber components, sound absorbing gears for AV and OA instruments, flasher components, portable telephone components, camera module components, heat-resistant gears for copiers, endcaps, commuters, industrial outlets, command switches, noise filters, magnet switches, solar cell substrates, liquid-crystal boards, LED mounting boards, flexible printed-wiring boards, flexible flat cables, etc.

As the automobile components, for example, there are mentioned cooling system components such as thermostat housings, radiator tanks, radiator hoses, water outlets, water pump housings, rear joints, etc.; breather components such as intercooler tanks, intercooler cases, turbo duct pipes, EGR cooler cases, resonators, throttle bodies, intake manifolds, tail pipes, etc.; fuel system components such as fuel delivery pipes, gasoline tanks, quick connectors, canisters, pump modules, fuel ducts, oil strainers, lock nuts, sealants, etc.; structural components such as mount blankets, torque rods, cylinder head covers, etc.; drive-line components such as bearing retainers, gear tensioners, head lamp actuator gears, slide door rollers, clutch-surrounding components, etc.; brake components such as air brake tubes, etc.; in-vehicle electric components such as wire harness connectors in engine rooms, motor components, sensors, ABS bobbins, combination switches, in-vehicle switches, etc.; interior and exterior components such as slide door dampers, door mirror stays, door mirror brackets, inner mirror stays, roof rails, engine mount brackets, inlet pipes of air cleaners, door checkers, plastic chains, emblems, clips, breaker covers, cup holders, air bags, fenders, spoilers, radiator supports, radiator grills, louvers, air scoops, hood bulges, back doors, fuel sender modules, etc.

The industrial components include, for example, gas pipes, pipes for oil digging, hoses, ant-proof cables (communication cables, path cables, etc.), coatings of powder-coated articles (inner coatings of water pipes), offshore oilfield pipes, pressure hoses, hydraulic tubes, paint tubes, fuel pumps, separators, supercharge ducts, butterfly valves, conveyor roller bearings, railroad tie spring holders, outboard engine covers, power generator engine covers, irrigation valves, large-size switches, monofilaments (extruded yarns) for fish nets, etc.

The fibers include, for example, airbag ground fabrics, heat-resistant filters, reinforcing fibers, bristles for brushes, fish lines, tire cords, artificial turfs, carpets, fibers for seats, etc.

The films and sheets include, for example, heat-resistant adhesive tapes such as heat-resistant masking tapes, industrial tapes, etc.; materials for magnetic tapes such as cassette tapes, magnetic tapes for digital data storage, video tapes, etc.; food packaging materials for pouches for retort foods, individual packaging of sweets, packaging of processed food products, etc.; electronic component packaging materials for packaging for semiconductor packages, etc.

In addition, the polyamide resin (A) and the polyamide resin composition of the present invention are also favorably used for plastic magnets, shoe soles, tennis rackets, ski boards, bond magnets, eyeglass frames, banding bands, tag pins, crescent sash locks, electric power tool motor fans, insulating blocks for motor stators, engine covers for lawn trimmers, fuel tanks for lawn trimmers, ultra-small-size slide switches, DIP switches, switch housings, lamp sockets, connector shells, IC sockets, bobbin covers, relay boxes, capacitor cases, small-size motor cases, gears, cams, dancing pulleys, spacers, insulators, fasteners, casters, wire clips, bicycle wheels, terminal blocks, insulating components of starters, fuse boxes, air cleaner cases, air conditioner fans, terminal housings, wheel covers, bearing retainers, water pipe impellers, clutch release bearing hubs, heat-resistant containers, microwave oven components, rice cooker components, printer ribbon guides, etc.

EXAMPLES

Hereinunder the present invention is described in detail with reference to Examples and Comparative Examples (hereinunder these are abbreviated as Examples and others), by which, however, the present invention is not limited. In the following Examples and others, the melting point, the solution viscosity, the content of polyamide (a-1) and polyamide oligomer (a-2) (% by mass), the terminal blocking ratio, the content ratio of trans isomer structural units derived from alicyclic monomer, the water absorption, the deflection temperature under load, the chemical resistance, the melt viscosity, the relative crystallinity degree and the mold deposit were measured or evaluated according to the methods mentioned below.

<Melting Point>

The melting point of the polyamide (polyamide 9C-1 to 4—the same shall apply hereinunder) used in each Example and others was measured using a differential scanning calorimeter (DSC822) manufactured by Mettler Toledo International Inc. Briefly, in a nitrogen atmosphere, the sample was heated from 30° C. up to 360° C. at a rate of 10° C./rain, and the peak temperature at the melting peak appearing during the heating is referred to as the melting point (° C.) of the sample. In case where the sample has plural melting peaks, the peak temperature at the melting peak on the highest temperature side is referred to as the melting point of the sample.

<Solution Viscosity>

The solution viscosity $\eta inh$ of the polyamide used in each Example and others was determined as follows. 50 mg of the polyamide was dissolved in 25 mL of 98% concentrated sulfuric acid in a measuring flask, and using an Ubbelohde viscometer, the dropping time (t) of the resultant solution at 30° C. was measured, and from the dropping time (to) of concentrated sulfuric acid, the solution viscosity of the sample was calculated according to the following mathematical expression (1).

$$\eta inh \ (dL/g) = \{\ln(t/t_0)\}/0.2 \tag{1}$$

<Content of Polyamide (a-1) and Polyamide Oligomer (a-2)>

The content (% by mass) of the polyamide (a-1) and that of the polyamide oligomer (a-2) in the polyamide resin (A) or the polyamide resin composition obtained in each Example and others were determined, based on the elution curve of each sample drawn in GPC (vertical axis: signal intensity from detector, horizontal axis: elution time), from the area of the region of a number-average molecular weight of from 500 to less than 2000 surrounded by the base line and the elution curve and the area of the region covering from a number-average molecular weight of 2000 to a number average molecular weight at the end of the main peak detection as surrounded by the base line and the elution curve, respectively. The measurement condition was as follows.

Detector: UV detector (wavelength: 210 nm)
Column: HFIP-806M manufactured by Showa Denko K.K. (inner diameter 8 mm×length 300 mm)
Solvent: hexafluoroisopropanol containing sodium trifluoroacetate at a concentration of 0.01 mol/L
Temperature: 40° C.
Flow Rate: 1 mL/min
Injection Amount: 90
Concentration: 0.5 mg/mL
Sample Preparation: In hexafluoroisopropanol containing 0.01 mol/L of sodium trifluoroacetate, the polyamide resin (A) or the polyamide resin composition obtained in each Example and others was weighed to be 0.5 mg/mL in terms of the polyamide resin (A), and dissolved by stirring for 1 hour at room temperature, and the resultant solution was filtered through a membrane filter (pore size 0.45 μm) to prepare a sample.
PMMA Standard Sample: Using STANDARD M-75 manufactured by Showa Denko K.K. (number-average molecular weight range; 1,800 to 950,000), a standard elution curve (calibration curve) was prepared.

The elution curve of the polyamide resin (A) obtained in Example 1 to be mentioned below, as prepared under the above-mentioned condition, is shown in FIG. 1 along with the regions of the polyamide (a-1) and the polyamide oligomer (a-2).

<Terminal Blocking Ratio>

The polyamide resin (A) or the polyamide resin composition obtained in each Example and others was injection-molded (mold temperature: 80° C.) at a cylinder temperature higher by about 20° C. than the melting point of each sample to prepare a sample piece having a length of 100 mm, a width of 40 mm and a thickness of 1 mm. About 20 to 30 mg was cut out from the resultant sample piece, dissolved in 1 mL of trifluoroacetic acid-d ($CF_3COOD$), and using nuclear magnetic resonance spectrometer JNM-ECX400 (400 MHz) manufactured by JEOL Ltd., the sample was analyzed for $^1$H-NMR at room temperature and at a number of times of scanning of 256. The carboxyl terminal (a), the amino terminal (b) and the terminal (c) blocked with terminal blocking agent were determined from the integral value of the characteristic signal of each terminal group, and the terminal blocking ratio (%) was calculated according to the mathematical expression (2).

Terminal Blocking Ratio (%)=$c/(a+b+c)/100$ (2)

<Trans Isomer Structural Unit Content Ratio>

The polyamide resin (A) or the polyamide resin composition obtained in each Example and others was injection-molded (mold temperature: 80° C.) at a cylinder temperature higher by about 20° C. than the melting point of each sample to prepare a sample piece having a length of 100 mm, a width of 40 mm and a thickness of 1 mm. About 20 to 30 mg was cut out from the resultant sample piece, dissolved in 1 mL of trifluoroacetic acid-d ($CF_3COOD$), and using nuclear magnetic resonance spectrometer JNM-ECX400 (400 MHz) manufactured by JEOL Ltd., the sample was analyzed for $^1$H-NMR at room temperature and at a number of times of scanning of 256. From the ratio of the peak area at 2.10 ppm derived from the β-hydrogen of the cis isomer of the 1,4-cyclohexanedicarboxylic acid structural unit to the peak area at 2.20 ppm derived from the β-hydrogen of the trans isomer structural unit, the trans isomer structural unit content (%) was determined.

<Water Absorption>

The polyamide resin (A) or the polyamide resin composition obtained in each Example and others was injection-molded (mold temperature: 80° C.) at a cylinder temperature higher by about 20° C. than the melting point of each sample to prepare a sample piece having a length of 60 mm, a width of 60 mm and a thickness of 2 mm according to ISO 62. The resultant sample piece was immersed in water at 23° C. for 1 day, and the mass increase was measured. The increasing ratio (%) relative to the mass before immersion was calculated to be an index of low water absorption. Samples having a smaller value absorb a smaller amount of water.

<Deflection Temperature Under Load>

The polyamide resin (A) or the polyamide resin composition obtained in each Example and others was injection-molded (mold temperature: 80° C.) at a cylinder temperature higher by about 20° C. than the melting point of each sample to prepare an ISO multipurpose sample piece type A (length 80 mm, width 10 mm, thickness 4 mm). The resultant sample piece was tested according to ISO 75-2/Af under a load of 1.8 MPa given thereto, and the deflection temperature under load thereof (° C.) was measured. This is an index of high-temperature rigidity of the test sample.

<Chemical Resistance>

The polyamide resin (A) or the polyamide resin composition obtained in each Example and others was injection-molded (mold temperature: 80° C.) at a cylinder temperature higher by about 20° C. than the melting point of each sample to prepare an ISO multipurpose sample piece type A. The resultant sample piece was immersed in an aqueous solution of super-long life coolant (pink) manufactured by Toyota diluted twice with water, and after thus immersed therein at 130° C. for 500 hours, the tensile strength of the sample piece was measured according to ISO 527. The ratio (%) of the tensile strength of the immersed test sample to that of the sample piece before immersion was calculated, and this is an index of chemical resistance of the sample piece.

<Melt Viscosity>

Using Capillograph (manufactured by Toyo Seiki Sei-saku-sho. Ltd.), the melt viscosity (Pa·s) of the polyamide resin (A) or the polyamide resin composition obtained in each Example and others was measured at a barrel temperature of 340° C. and at a shear rate of 121.6 $sec^{-1}$ (capillary: inner diameter 1.0 mm×length 10 mm, extrusion rate 10 mm/min), and this is an index of a flowability of the tested sample.

<Relative Crystallinity Degree>

The polyamide resin composition obtained in each Example and others was injection-molded under the condition mentioned below to prepare a sample piece having a length of 100 mm, a width of 40 mm and a thickness of 1 mm. About 10 mg was cut out from the resultant sample piece, and using DSC822, this was heated from 30° C. up to 360° C. in a nitrogen atmosphere at a rate of 10° C./min. An amorphous region, if any, in the polyamide resin (A) constituting the polyamide resin composition would give a crystallization peak caused by the progress of crystallization in the amorphous region in the temperature range of from 80 to 150° C. in the heating step. In this specification, the quantity of heat calculated from the crystallization peak is referred to as "quantity of crystallization heat ΔHc". In the heating process from 30° C. up to 360° C. at a heating rate of 10° C./min, a crystal melting peak is detected after the detection of the crystallization peak or without detection of the crystallization peak. In this specification, the quantity of heat calculated from the crystal melting peak is referred to as "quantity of crystal melting heat ΔHm". Using these ΔHc and ΔHm, the relative crystallinity degree (%) was calculated according to the following mathematical expression (3), and this is an index of moldability in a mold at 80° C.

Temperature of polyamide resin (A) or polyamide resin composition in injection molding: 340° C.

Mold temperature: 80° C.
Injection rate: 60 mm/sec
Injection time: 2 sec
Cooling time: 5 sec Relative Crystallinity Degree (%)=(ΔHm−ΔHc)/ΔHm×100 (3)

<Mold Deposit>

Figure 2:
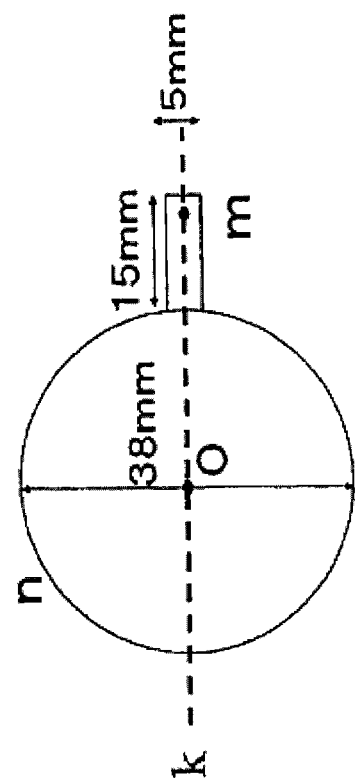
FIG. 2 This is a front view of a mold used in injection molding for evaluation of mold deposit.
Figure 3:
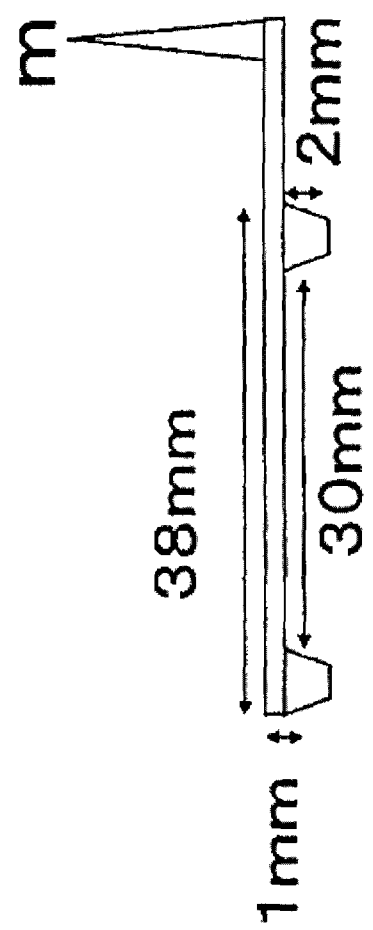
FIG. 3 This is a cross-sectional view of a mold used in injection molding for evaluation of mold deposit.

The polyamide resin (A) of the polyamide resin composition obtained in each Example and others was injection-molded using a mold having the figuration as shown in FIGS. 2 and 3 (FIG. 2: front view, FIG. 3: cross-sectional view with the k-axis as the cutting plane) under the condition mentioned below. The polyamide resin (A) or the polyamide resin composition enters at the projection terminal m in the drawing, and runs toward the flow terminal 0 from the periphery of the circle n in FIG. 2. The mold was visually checked for deposit (discoloration) at the flow terminal 0 thereof after continuous injection of 500 shots. The case where the mold had neither deposition nor tarnish was evaluated as (A), the case where the mold tarnished was evaluated as (B), and the case where the mold had deposition was evaluated as (C), thereby providing indicators for mold deposit.

Temperature of polyamide resin (A) or polyamide resin composition in injection molding: 340° C.
Mold temperature: 80° C.
Injection rate: 60 mm/sec
Injection time: 2 sec
Cooling time: 5 sec Polyamide resins (A) and compounds (B) acting as a Lewis base, which are used in Examples and others, are shown below.

<Polyamide Resin (A)>

The following polyamides were formulated in the ratio shown in Table 1 to prepare polyamide resins (A).

Polyamide 9C-1:

1,4-Cyclohexanedicarboxylic acid (5111.2 g, 29.7 mol) with a ratio of trans form/cis form=30/70 (molar ratio), 1,9-nonanediamine (4117.6 g, 26.0 mol), 2-methyl-1,8-octanediamine (726.6 g, 4.59 mol), acetic acid as a terminal blocking agent (110.4 g, 1.84 mol), sodium hypophosphite monohydrate as a catalyst (10 g), and distilled water (2.5 L) were put into an autoclave having an internal volume of 40 L, and purged with nitrogen. The internal temperature of the autoclave was raised to 200° C., taking 2 hours. In this stage, the autoclave pressure increased up to 2 MPa. For 2 hours after this, the reaction was carried out while water vapor was gradually degassed so as to keep the pressure at 2 MPa. Next, the pressure was lowered down to 1.2 MPa, taking 30 minutes, to prepare a prepolymer. The prepolymer was ground, and dried at 120° C. under reduced pressure for 12 hours. This was polymerized in a solid phase for 10 hours at 230° C. under 13.3 Pa to give a polyamide 9C-1 having a solution viscosity ηinh of 0.87 dL/g.

Polyamide 9C-2:

1,4-Cyclohexanedicarboxylic acid (5111.2 g, 29.7 mol) with a ratio of trans form/cis form=30/70 (molar ratio), 1,9-nonanediamine (4117.6 g, 26.0 mol), 2-methyl-1,8-octanediamine (726.6 g, 4.59 mol), acetic acid as a terminal blocking agent (110.4 g, 1.84 mol), sodium hypophosphite monohydrate as a catalyst (10 g), and distilled water (2.5 L) were put into an autoclave having an internal volume of 40 L, and purged with nitrogen. The internal temperature of the autoclave was raised to 200° C., taking 2 hours. In this stage, the autoclave pressure increased up to 2 MPa. For 2 hours after this, the reaction was carried out while water vapor was gradually degassed so as to keep the pressure at 2 MPa. Next, the pressure was lowered down to 1.2 MPa, taking 30 minutes, to prepare a prepolymer. The prepolymer was ground, and dried at 120° C. under reduced pressure for 12 hours to give a polyamide 9C-2 having a solution viscosity ηinh of 0.23 dL/g.

Polyamide 9C-3:

The polyamide 9C-1 was extracted in hot water at 80° C. for 8 hours. Subsequently, this was dried at 120° C. under reduced pressure for 12 hours to give a polyamide 9C-3 having a solution viscosity ηinh of 0.89 dL/g.

Polyamide 9C-4:

1,4-Cyclohexanedicarboxylic acid (5111.2 g, 29.7 mol) with a ratio of trans form/cis form=30/70 (molar ratio), 1,9-nonanediamine (4117.6 g, 26.0 mol), 2-methyl-1,8-octanediamine (726.6 g, 4.59 mol), acetic acid as a terminal blocking agent (110.4 g, 1.84 mol), sodium hypophosphite monohydrate as a catalyst (10 g), and distilled water (2.5 L) were put into an autoclave having an internal volume of 40 L, and purged with nitrogen. The internal temperature of the autoclave was raised to 200° C., taking 2 hours. In this stage, the autoclave pressure increased up to 2 MPa. For 2 hours after this, the reaction was carried out while water vapor was gradually degassed so as to keep the pressure at 2 MPa. Next, the pressure was lowered down to 1.2 MPa, taking 30 minutes, to prepare a prepolymer. The prepolymer was ground, and dried at 120° C. under reduced pressure for 12 hours. This was polymerized in an extrusion polymerization apparatus under reduced pressure and at a temperature of 350° C. so that the residence time therein could be 30 minutes to give a polyamide 9C-4 having a solution viscosity ηinh of 0.78 dL/g.

<Compound (B) Acting as Lewis Base>

(1) Magnesium oxide: "MF-150" manufactured by Kyowa Chemical Industry Co., Ltd. (mean particle size: 0.71 μm)

(2) Calcium oxide: "calcium oxide" manufactured by Kanto Chemical Co., Inc. (mean particle size: 15 μm)

(3) Zinc oxide: "zinc oxide" manufactured by Wako Pure Chemical Industries, Ltd. (mean particle size: 5.0 vtra or less)

Examples 1 to 7 and Comparative Examples 1 to 3

The polyamide 9C-1, the polyamide 9C-2, the polyamide 9C-3 and the polyamide 9C-4 were formulated each in the amount shown in Table 1 to prepare a mixture, the resultant mixture was dried under reduced pressure at 120° C. for 24 hours, and then the compound (B) acting as a Lewis base was dry-blended therewith in the amount shown in Table 1. The resultant mixture was fed into a twin-screw extruder (screw diameter: 30 mm, L/D=28, cylinder temperature 350° C., rotation number 150 rpm) via the hopper thereof, and melt-kneaded therein, then extruded in strands, and cut with a pelletizer to give pellets of a polyamide resin (A) and a polyamide resin composition. The resultant polyamide resin (A) and the polyamide resin composition were formed into sample pieces having a predetermined shape, according to the method described above, and the physical properties thereof were evaluated. The results are shown in Table 1.

TABLE 1

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Polyamide Resin (A) and Polyamide Resin Composition (formulation) | | | | | | | | | | | |
| Polyamide Resin (A) | | | | | | | | | | | |
| Polyamide 9C-1 (m.p. 327° C.) | (mass part) | 95 | 85 | 95 | 95 | 95 | 85 | | 100 | 100 | |

TABLE 1-continued

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Polyamide 9C-2 (m.p. 322° C.) | (mass part) | 5 | 15 | 5 | 5 | 5 | 15 | | | | |
| Polyamide 9C-3 (m.p. 327° C.) | (mass part) | | | | | | | | | | 100 |
| Polyamide 9C-4 (m.p. 324° C.) | (mass part) | | | | | | | 100 | | | |
| Compound (B) acting as Lewis Base | | | | | | | | | | | |
| Magnesium Oxide | (mass part) | | | 2 | | | 2 | 2 | | 2 | 2 |
| Calcium Oxide | (mass part) | | | | 2 | | | | | | |
| Zinc Oxide | (mass part) | | | | | 2 | | | | | |
| Polyamide Resin (A) and Polyamide Resin Composition (properties) | | | | | | | | | | | |
| Polyamide (a-1) | (mass %) | 98.7 | 98.5 | 98.7 | 98.7 | 98.7 | 98.5 | 97.5 | 99.97 | 99.97 | 99.99 |
| Polyamide Oligomer (a-2) | (mass %) | 1.3 | 1.5 | 1.3 | 1.3 | 1.3 | 1.5 | 2.5 | 0.03 | 0.03 | 0.01 |
| Terminal Blocking Ratio | (%) | 46 | 46 | 46 | 46 | 46 | 46 | 46 | 46 | 46 | 46 |
| Trans Isomer Structural Unit Content Ratio | (%) | 81 | 81 | 84 | 84 | 84 | 84 | 84 | 81 | 84 | 84 |
| Water Absorption | (mass %) | 0.38 | 0.38 | 0.38 | 0.38 | 0.38 | 0.38 | 0.38 | 0.41 | 0.41 | 0.41 |
| Deflection Temperature under load | (° C.) | 120 | 120 | 130 | 130 | 130 | 130 | 130 | 120 | 127 | 127 |
| Chemical Resistance | (%) | 63 | 63 | 65 | 65 | 65 | 65 | 65 | 60 | 60 | 60 |
| Melt Viscosity | (Pa · s) | 10 | 10 | 10 | 10 | 10 | 10 | 2 | 40 | 40 | 80 |
| Relative Crystallinity Degree | (%) | 100 | 100 | 100 | 100 | 100 | 100 | 100 | 95 | 95 | 95 |
| Mold Deposit | | A | A | A | A | A | A | A-B | A | A | A |

In Examples 1 to 7, the content of the polyamide (a-1), the content of the polyamide oligomer (a-2) and the trans isomer structural unit content ratio each are within the specified range, and therefore the samples are excellent in heat resistance, low water absorption, high-temperature rigidity, chemical resistance, flowability, and moldability (the relative crystallinity degree is large), and do not cause mold deposit. Above all, in Examples 3 to 7, the samples contain the compound (B) acting as a Lewis base, and therefore have a high trans isomer structural unit content, and accordingly, their high-temperature rigidity and chemical resistance are more excellent. Example 7 differs slightly from Examples 1 to 6 in point of mold deposit. In Comparative Examples 1 to 3, the amount of the polyamide oligomer (a-2) is small, and therefore the samples are poor in low water absorption, flowability, moldability and chemical resistance.

INDUSTRIAL APPLICABILITY

The polyamide resin (A) and the polyamide resin composition of the present invention are excellent in heat resistance, low temperature absorption, high-temperature rigidity, chemical resistance and flowability, and secure sufficient crystallization even when molded in a mold at 80° C., causing minimal mold deposit during production, and can be widely utilized, for example, as various component materials for electric and electronic components, automobile components, industrial material components, daily necessities, domestic articles, etc.

The invention claimed is:

1. A polyamide resin (A), consisting of:
from 98 to 99.95% by mass of a polyamide (a-1) having a number-average molecular weight of 2000 or more; and
from 0.05 to 2% by mass of a polyamide oligomer (a-2) having a number-average molecular weight of from 500 to less than 2000, wherein:
the polyamide oligomer (a-2) has a lower melting point than the polyamide (a-1);
at least 25 mol % of all the monomer units constituting the polyamide (a-1) and the polyamide oligomer (a-2) are structural units derived from a cyclic aliphatic dicarboxylic acid represented by formula (I) or formula (II):

$$X-Z-X \quad (I);$$

$$X-R^1-Z-R^2-X \quad (II);$$

X represents a carboxyl group;
Z represents an alicyclic structure having 3 or more carbon atoms;
$R^1$ and $R^2$ each independently represent an alkylene group having 1 or more carbon atoms;
the structural units derived from the cyclic aliphatic dicarboxylic acid, which constitute the polyamide (a-1) and the polyamide oligomer (a-2), are the same;
a content ratio of trans isomer structural units derived from the cyclic aliphatic dicarboxylic acid is from 50 to 85 mol %; and
the polyamide resin (A) is in the form of pellets consisting of the polyamide (a-1) and the polyamide oligomer (a-2).

2. The polyamide resin (A) according to claim 1, wherein at least 10% of a total of terminal groups in molecular chains of the polyamide (a-1) and the polyamide oligomer (a-2) are blocked with a terminal blocking agent.

3. The polyamide resin (A) according to claim 1, wherein the cyclic aliphatic dicarboxylic acid is 1,4-cyclohexanedicarboxylic acid.

4. The polyamide resin (A) according to claim 1, wherein the polyamide (a-1) and the polyamide oligomer (a-2) comprise a structural unit derived from an aliphatic diamine having from 4 to 12 carbon atoms.

5. The polyamide resin (A) according to claim 4, wherein the aliphatic diamine is at least one selected from the group consisting of 1,4-butanediamine, 1,5-pentanediamine, 1,6-hexanediamine, 2-methyl-1,5-pentanediamine, 1,8-octanediamine, 1,9-nonanediamine, 2-methyl-1,8-octanediamine, 1,10-decanediamine, 1,11-undecanediamine and 1,12-dodecanediamine.

6. The polyamide resin (A) according to claim 5, wherein the polyamide (a-1) and the polyamide oligomer (a-2) comprise a structural unit derived from 1,4-cyclohexanedicarboxylic acid in an amount of 25 mol % or more, and as the structural unit derived from the aliphatic diamine, structural units derived from at least one of 1,9-nonanediamine and 2-methyl-1,8-octanediamine in an amount of 25 mol % or more.

7. A polyamide resin composition, comprising:
a polyamide resin (A); and
from 0.1 to 10 parts by mass of a compound (B) acting as a Lewis base, relative to 100 parts by mass of the polyamide resin (A),
wherein:
the polyamide resin (A), comprises:
from 98 to 99.95% by mass of a polyamide (a-1) having a number-average molecular weight of 2000 or more, and
from 0.05 to 2% by mass of a polyamide oligomer (a-2) having a number-average molecular weight of from 500 to less than 2000;
the polyamide oligomer (a-2) has a lower melting point than the polyamide (a-1);
at least 25 mol % of all the monomer units constituting the polyamide (a-1) and the polyamide oligomer (a-2) are structural units derived from a cyclic aliphatic dicarboxylic acid represented by formula (I) or formula (II):

$$X-Z-X \quad (I),$$

$$X-R^1-Z-R^2-X \quad (II);$$

X represents a carboxyl group;
Z represents an alicyclic structure having 3 or more carbon atoms;
$R^1$ and $R^2$ each independently represent an alkylene group having 1 or more carbon atoms;
the structural units derived from the cyclic aliphatic dicarboxylic acid, which constitute the polyamide (a-1) and the polyamide oligomer (a-2), are the same;
a content ratio of trans isomer structural units derived from the cyclic aliphatic dicarboxylic acid is from 50 to 85 mol %; and
the polyamide resin composition does not contain a flame retardant.

8. The polyamide resin composition according to claim 7, wherein the compound (B) is at least one selected from a group consisting of an alkali metal oxide, an alkali metal hydroxide, an alkaline earth metal oxide, an alkaline earth metal hydroxide, zinc oxide and zinc hydroxide.

9. The polyamide resin composition according to claim 8, wherein the compound (B) is at least one selected from a group consisting of potassium oxide, magnesium oxide, calcium oxide, zinc oxide, potassium hydroxide, magnesium hydroxide, calcium hydroxide and zinc hydroxide.

10. A molded article, comprising the polyamide resin (A) according to claim 1.

11. A molded article, comprising the polyamide resin composition according to claim 7.

12. A polyamide resin (A), consisting of:
from 95 to 99.95% by mass of a polyamide (a-1) having a number-average molecular weight of 2000 or more; and
from 0.05 to 5% by mass of a polyamide oligomer (a-2) having a number-average molecular weight of from 500 to less than 2000,
wherein:
the polyamide oligomer (a-2) has a lower melting point than the polyamide (a-1);
at least 25 mol % of all the monomer units constituting the polyamide (a-1) and the polyamide oligomer (a-2) are structural units derived from a cyclic aliphatic dicarboxylic acid represented by formula (I) or formula (II):

$$X-Z-X \quad (I),$$

$$X-R^1-Z-R^2-X \quad (II);$$

X represents a carboxyl group;
Z represents an alicyclic structure having 3 or more carbon atoms;
$R^1$ and $R^2$ each independently represent an alkylene group having 1 or more carbon atoms;
the structural units derived from the cyclic aliphatic dicarboxylic acid, which constitute the polyamide (a-1) and the polyamide oligomer (a-2), are the same;
a content ratio of trans isomer structural units derived from the cyclic aliphatic dicarboxylic acid is from 50 to 85 mol %;
the polyamide resin (A) is in the form of pellets consisting of the polyamide (a-1) and the polyamide oligomer (a-2).

13. A polyamide resin composition, comprising:
a polyamide resin (A); and
from 0.1 to 10 parts by mass of a compound (B) acting as a Lewis base, relative to 100 parts by mass of the polyamide resin (A),
wherein:
the polyamide resin (A) comprises:
from 95 to 99.95% by mass of a polyamide (a-1) having a number-average molecular weight of 2000 or more, and
from 0.05 to 5% by mass of a polyamide oligomer (a-2) having a number-average molecular weight of from 500 to less than 2000;
the polyamide oligomer (a-2) has a lower melting point than the polyamide (a-1);
at least 25 mol % of all the monomer units constituting the polyamide (a-1) and the polyamide oligomer (a-2) are structural units derived from a cyclic aliphatic dicarboxylic acid represented by formula (I) or formula (II):

$$X-Z-X \quad (I),$$

$$X-R^1-Z-R^2-X \quad (II);$$

X represents a carboxyl group;
Z represents an alicyclic structure having 3 or more carbon atoms;
$R^1$ and $R^2$ each independently represent an alkylene group having 1 or more carbon atoms;
the structural units derived from the cyclic aliphatic dicarboxylic acid, which constitute the polyamide (a-1) and the polyamide oligomer (a-2), are the same;
a content ratio of trans isomer structural units derived from the cyclic aliphatic dicarboxylic acid is from 50 to 85 mol %; and
the polyamide resin composition does not contain a flame retardant.

14. The polyamide resin (A) according to claim 4, wherein the structural units derived from the aliphatic diamine, which constitute the polyamide (a-1) and the polyamide oligomer (a-2), are the same.

* * * * *